US009673486B2

(12) United States Patent
Chen et al.

(10) Patent No.: US 9,673,486 B2
(45) Date of Patent: Jun. 6, 2017

(54) PREPARATION METHOD OF LAMINATED CELL

(71) Applicant: Ningde Amperex Technology Limited, Ningde (CN)

(72) Inventors: Xianrui Chen, Ningde (CN); Huaiyong Zhang, Ningde (CN); Yanming Liang, Ningde (CN); Baoan Jia, Ningde (CN); Jingbin Lin, Ningde (CN); Qiuyan Liu, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 41 days.

(21) Appl. No.: 14/728,842

(22) Filed: Jun. 2, 2015

(65) Prior Publication Data

US 2016/0006079 A1    Jan. 7, 2016

(30) Foreign Application Priority Data

Jul. 3, 2014   (CN) .......................... 2014 1 0314154

(51) Int. Cl.
*H01M 10/0583* (2010.01)
*H01M 10/04* (2006.01)
*H01M 10/052* (2010.01)

(52) U.S. Cl.
CPC ... *H01M 10/0583* (2013.01); *H01M 10/0459* (2013.01); *H01M 10/052* (2013.01); *Y02P 70/54* (2015.11)

(58) Field of Classification Search
CPC ......... H01M 10/0583; H01M 10/0459; H01M 10/052; Y02P 70/54
See application file for complete search history.

(56) References Cited

U.S. PATENT DOCUMENTS

| 4,211,833 A | * | 7/1980 | Einstein | ................... H01M 2/18 |
| | | | | 429/149 |
| 6,224,995 B1 | | 5/2001 | Fauteux et al. | |
| 7,014,948 B2 | | 3/2006 | Lee et al. | |

(Continued)

FOREIGN PATENT DOCUMENTS

| CN | 103620852 A | 3/2014 |
| KR | 10-2014-0050182 | 4/2014 |

*Primary Examiner* — Gregg Cantelmo
(74) *Attorney, Agent, or Firm* — Morgan, Lewis & Bockius LLP (57) ABSTRACT

The present disclosure provides a preparation method of a laminated cell comprising: providing a laminated pack: the laminated pack comprises n laminated groups, the each laminated group comprises m electrode plate assemblies, a spacer is provided between the adjacent laminated groups, the electrode plate assemblies of all the laminated groups of the laminated pack and the spacers between the adjacent laminated groups are orderly positioned in a Z-shaped separator in a laminating direction, an upper part and a lower part of the separator adjacent to the each spacer are separated by the each spacer; forming a laminated cell: the separator is broken at an end of the each spacer positioned in the separator to allow the each spacer and the each laminated group to separate from each other, so as to obtain the corresponding laminated cell formed by the electrode plate assembly of the each laminated group and the corresponding separator.

16 Claims, 5 Drawing Sheets

(56) References Cited

U.S. PATENT DOCUMENTS

| | | | |
|---|---|---|---|
| 2009/0165936 A1* | 7/2009 | Sakata | B32B 38/1808 |
| | | | 156/227 |
| 2010/0203384 A1* | 8/2010 | West | H01M 2/08 |
| | | | 429/209 |
| 2013/0295436 A1 | 11/2013 | Kwon et al. | |
| 2014/0087224 A1 | 3/2014 | Kim et al. | |
| 2016/0006071 A1* | 1/2016 | Li | H01M 10/045 |
| | | | 156/227 |

* cited by examiner

PREPARATION METHOD OF LAMINATED CELL

CROSS-REFERENCE TO RELATED APPLICATIONS

The present application claims priority to Chinese patent application No. CN201410314154.8 filed on Jul. 3, 2014, which is incorporated herein by reference in its entirety.

TECHNICAL FIELD OF THE PRESENT DISCLOSURE

The present disclosure relates to the technical field of electrochemical energy storage devices, and particularly relates to a preparation method of a laminated cell.

BACKGROUND OF THE PRESENT DISCLOSURE

Lithium-ion batteries have been more and more widely used in the fields of mobile electronic devices, electric vehicles, energy storage and the like as the most representative energy storage devices in the new energy field. The lithium-ion battery can be divided into a wound-type lithium-ion battery and a laminated-type lithium-ion battery according to the preparation process.

At present, a preparation process of a cell of the laminated-type lithium-ion battery is basically divided into the following three modes:

(1) simple laminated mode: a positive electrode plate, a negative electrode plate and a separator are cut into a predetermined size, then the cut positive electrode plate, the cut negative electrode plate and the cut separator are laminated in accordance with the order of the negative electrode plate-the separator-the positive electrode plate-the separator-the negative electrode plate, thereby obtaining the laminated-type lithium-ion cell;

(2) Z-shaped separator mode: a positive electrode plate and a negative electrode plate are cut into a predetermined size, then the cut positive electrode plate and the cut negative electrode plate are orderly inserted into a separator folded as a Z shape, thereby obtaining the laminated-type lithium-ion cell;

(3) winding-separator mode: a positive electrode plate and a negative electrode plate are cut into a predetermined size, then the cut positive electrode plate and cut the negative electrode plate are engaged on a separator, finally the separator is wound, thereby obtaining the laminated-type lithium-ion cell.

Because in the preparation process of the traditional laminated-type cell with the Z-shaped separator mode, every time the preparation of one cell is completed, the separator needs to be cut off so as to perform preparation of the next cell, such an operation is relatively complex, preparation of every cell will require a longer auxiliary time, therefore, production efficiency needs to be improved, and it is required for higher durability and other performances of a separator cutting device.

SUMMARY OF THE PRESENT DISCLOSURE

In view of the problem existing in the background, an object of the present disclosure is to provide a preparation method of a laminated cell, which can greatly improve the efficiency of the preparation of the laminated cell adopting a Z-shaped separator.

In order to achieve the above object, the present disclosure provides a preparation method of a laminated cell comprising steps of: providing a laminated pack: the laminated pack comprises n laminated groups, the each laminated group comprises m electrode plate assemblies and the numbers of the electrode plate assemblies of all the laminated groups are the same or different, and $n \geq 2$, $m \geq 2$, a spacer is provided between the adjacent laminated groups, the electrode plate assemblies of all the laminated groups of the laminated pack and the spacers between the adjacent laminated groups are orderly positioned in a Z-shaped separator in a laminating direction, an upper part and a lower part of the separator adjacent to the each spacer are separated by the each spacer; and forming a laminated cell: the separator is broken at an end of the each spacer positioned in the separator to allow the each spacer and the each laminated group to separate from each other, so as to obtain the corresponding laminated cell formed by the electrode plate assembly of the each laminated group and a corresponding part of the separator; the each laminated cell comprises a positive electrode plate and a negative electrode plate, or a mono-cell, or combination of the mono-cell and the positive electrode plate and/or the negative electrode plate; the positive electrode plate, the negative electrode plate, and the mono-cell are collectively referred to as the electrode plate assembly; the mono-cell is composed of the positive electrode plate, the negative electrode plate, and another separator between the positive electrode plate and the negative electrode plate; the positive electrode plate is provided with a positive electrode tab, the negative electrode plate is provided with a negative electrode tab; the positive electrode tab and the negative electrode tab of the each laminated cell are provided on the same side or different sides in a direction perpendicular to the laminating direction of the laminated pack and a folding direction of the Z-shaped separator.

The present disclosure has the following beneficial effects:

By that the spacer is adopted, a plurality of laminated groups can be provided in one laminated pack, the separator is broken at the end of the each spacer positioned in the separator, therefore the each spacer and the each laminated group can be separated from each other, so as to form a plurality of laminated cells, in this way, an auxiliary time is saved, thereby greatly improving the efficiency of the preparation of the laminated cell adopting the Z-shaped separator.

BRIEF DESCRIPTION OF THE FIGURES

The organization and manner of the structure and operation of the present disclosure, together with further objects and advantages thereof, may best be understood by reference to the following description, taken in connection with the accompanying Figures, wherein like reference numerals identify like elements, and in which.

Reference numerals of the embodiments are represented as follows:
1 laminated pack
   11 laminated group
   S laminating direction
2 spacer
   L2 length
   W2 width
3 separator
   F folding direction
   W3 width
3' separator
4 pressing mechanism
   SC laminated cell
   BC mono-cell
   P positive electrode plate
   N negative electrode plate
   $T_P$ positive electrode tab
   $T_N$ negative electrode tab
5 roller
6 hot plate
7 cutter

DETAILED DESCRIPTION

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

Figure 3:
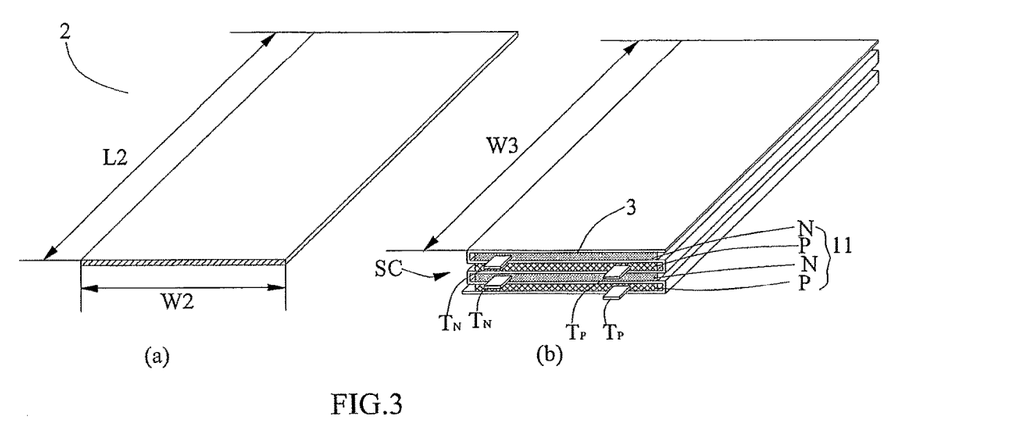
FIG. 3 illustrates an embodiment of a laminated cell prepared in FIG. 2, in which a positive electrode tab and a negative electrode tab are positioned on the same side, meanwhile a spacer is illustrated for ease in illustrating the dimensional relationships between the spacer and a separator, and an electrode plate assembly, and (a) illustrates the spacer, and (b) illustrates the laminated cell.
Figure 4:
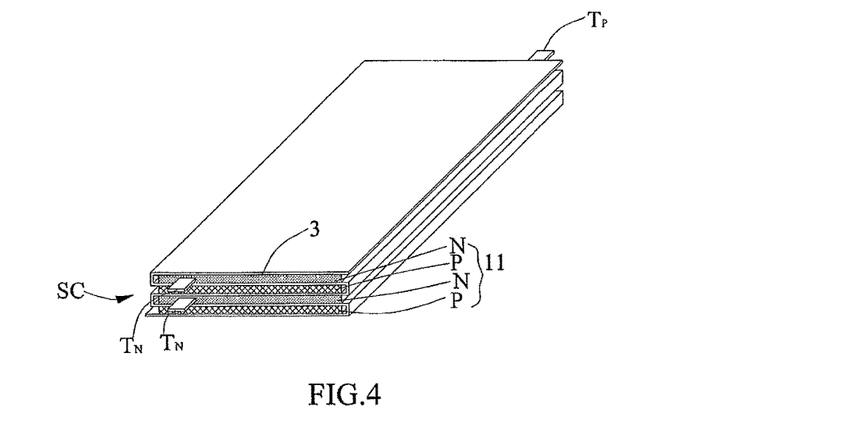
FIG. 4 illustrates an embodiment of the laminated cell prepared in FIG. 2, in which the positive electrode tab and the negative electrode tab are positioned on opposite sides, respectively.
Figure 5:
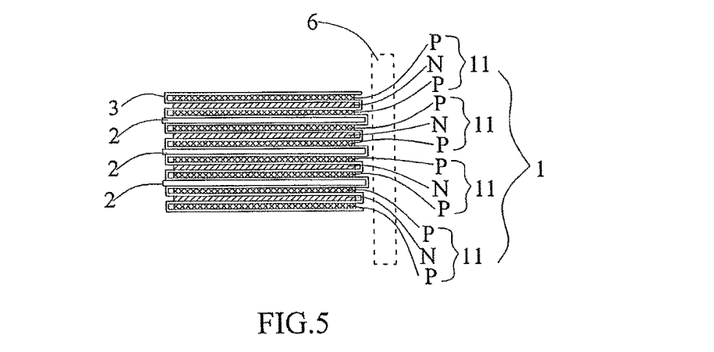
FIG. 5 illustrates an alternative embodiment of (c) in FIG. 1, in which the separator is broken with a hot plate.
Figure 6:
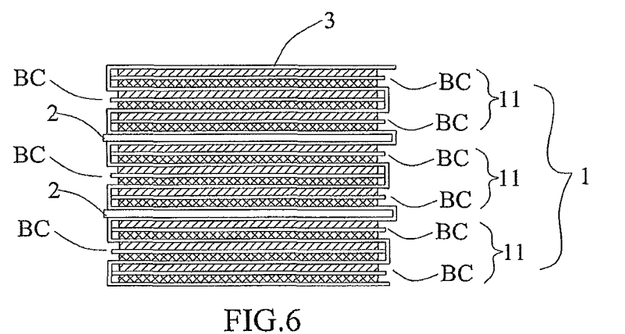
FIG. 6 illustrates an embodiment of the preparation method of the laminated cell according to the present disclosure, in which the electrode plate assembly adopts a mono-cell.
Figure 7:
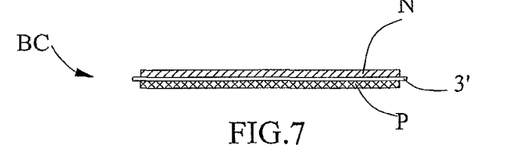
FIG. 7 illustrates a structure of the mono-cell adopted in FIG. 6.

Referring to FIG. 1, FIG. 2, FIG. 6 and FIG. 9, a preparation method of a laminated cell according to the present disclosure comprises steps of: providing a laminated pack: the laminated pack 1 comprises n laminated groups 11, the each laminated group 11 comprises m electrode plate assemblies and the numbers of the electrode plate assemblies of all the laminated groups 11 are the same or different (referring to FIG. 1, FIG. 2, FIG. 6 and FIG. 9), and n≥2, m≥2, a spacer 2 is provided between the adjacent laminated groups 11, the electrode plate assemblies of all the laminated groups 11 of the laminated pack 1 and the spacers 2 between the adjacent laminated groups 11 are orderly positioned in a Z-shaped separator 3 in a laminating direction S, an upper part and a lower part of the separator 3 adjacent to the each spacer 2 are separated by the each spacer 2 (referring to FIG. 1 and FIG. 2); and forming a laminated cell: the separator 3 is broken at an end of the each spacer 2 positioned in the separator 3 (on the right side in FIG. 1 and on the left side in FIG. 2) to allow the each spacer 2 and the each laminated group 11 to separate from each other, so as to obtain the corresponding laminated cell SC formed by the electrode plate assembly of the each laminated group 11 and a corresponding part of the separator 3; the each laminated cell SC comprises a positive electrode plate P and a negative electrode plate N, or a mono-cell BC, or combination of the mono-cell BC and the positive electrode plate P and/or the negative electrode plate N; the positive electrode plate P, the negative electrode plate N, and the mono-cell BC are collectively referred to as the electrode plate assembly; the mono-cell BC is composed of the positive electrode plate P, the negative electrode plate N, and another separator 3' between the positive electrode plate P and the negative electrode plate N (referring to FIG. 7); the positive electrode plate P is provided with a positive electrode tab $T_P$, the negative electrode plate N is provided with a negative electrode tab $T_N$; the positive electrode tab $T_P$ and the negative electrode tab $T_N$ of the each laminated cell SC are provided on the same side (referring to FIG. 3) or different sides (referring to FIG. 4) in a direction perpendicular to the laminating direction S of the laminated pack 1 and a folding direction F of the Z-shaped separator 3. Here, it should be noted that, in the practical production, because the separator 3 may be in the case of continuous unwinding, for this case, the separator 3 can be cut off at a laminating tail end of the laminated pack 1 after completion of providing the laminated pack 1; of course it is not limited to that, if a length of the separator 3 is provided precisely, the separator 3 does not have to be cut off at the laminating tail end of the laminated pack 1, in other words, the length of the separator 3 just meets the requirements of the laminated pack 1. In addition, in order to prevent loosening of the laminated groups 11 of the laminated pack 1, preferably, an end portion of the electrode plate assembly and an end portions of the spacer 2 positioned in the Z-shaped separator 3 along the folding direction F all contact the separator 3 (that is the end portions are surrounded by and in contact with the separator 3, referring to FIG. 1 and FIG. 2). Of course it is not limited to that, the end portion of the electrode plate assembly and the end portion of the spacer 2 positioned in the Z-shaped separator 3 along the folding direction F may not be in contact with the separator 3 (that is the end portions are surrounded by but not in contact with the separator 3) according to the practical production situation.

In the preparation method of the laminated cell according to the present disclosure, by that the spacer 2 is adopted, a plurality of laminated groups 11 can be provided in the laminated pack 1, the separator 3 is broken at the end of the each spacer 2 positioned in the separator 3, so that the each spacer 2 and the each laminated group 11 can be separated from each other, so as to form a plurality of laminated cells SC, thereby greatly improving the efficiency of the preparation of the laminated cell SC adopting the Z-shaped separator 3. Here, it should be noted that, the each spacer 2 and the each laminated group 11 are separated from each other as long as the separator 3 is broken at the end of the each spacer 2 positioned in the separator 3 without the need for pulling the each spacer 2 out.

In the step of providing the laminated pack, the manners for providing the laminated pack may include following two manners according to manners for forming the Z-shaped separator 3.

In an embodiment, referring to FIG. 1, in the step of providing the laminated pack, a manner for providing the laminated pack is as follows: providing a first laminated group 11: putting a first electrode plate assembly (in FIG. 1, the first electrode plate assembly is an positive electrode plate P) of the first laminated group 11 on an end portion of the separator 3, folding the separator 3 and attaching the separator 3 to the first electrode plate assembly of the first laminated group 11, then putting a second electrode plate assembly (in FIG. 1, the second electrode plate assembly is a negative electrode plate N) of the first laminated group 11 on the folded separator 3, folding the separator 3 again and attaching the separator 3 to the second electrode plate assembly of the first laminated group 11, such repeated, until the m-th electrode plate assembly (in FIG. 1, the number of the electrode plate assembly of the first laminated group 11 is 3, that is m=3) is put on the separator 3 and the separator 3 is folded; putting the spacer 2 on the separator 3 and folding the separator 3; providing a second laminated group 11: putting a first electrode plate assembly (in FIG. 1, the first electrode plate assembly is a positive electrode plate P) of the second laminated group 11 on the separator 3 folded on the spacer 2, folding the separator 3 and attaching the separator 3 to the first electrode plate assembly of the second laminated group 11, then putting a second electrode plate assembly (in FIG. 1, the second electrode plate assembly is a negative electrode plate N) of the second laminated group 11 on the folded separator 3, folding the separator 3 again and attaching the separator 3 to the second electrode plate assembly of the second laminated group 11, until the m-th electrode plate assembly (in FIG. 1, the number of the electrode plate assembly of the second laminated group 11 is 3, that is m=3) of the second laminated group 11 is put on the separator 3 and the separator 3 is folded; putting another spacer 2 on the separator 3 and folding the separator 3; and such repeated, until the n-th laminated group 11 (in FIG. 1, the laminated group 11 is provided as four in number from bottom to top, that is n=4) is provided.

In an embodiment, referring to FIG. 2, in the step of providing the laminated pack, a manner for providing the laminated pack is as follows: supporting the separator 3 to form a Z-shape using a plurality of rollers 5; inserting the spacers 2 and the electrode plate assemblies of the each laminated group 11 into the Z-shaped separator 3, so as to allow the electrode plate assemblies of all the laminated groups 11 of the laminated pack 1 and the spacers 2 between the adjacent laminated groups 11 orderly positioned in the Z-shaped separator 3; and pulling the plurality of rollers 5 out. The embodiment can allow the preparation process of the laminated cell more efficient, that is because after the separator 3 is supported to form the Z shape using the plurality of rollers 5, all the spacers 2 and the electrode plate assemblies of the each laminated group 11 are simultaneously and correspondingly inserted into the Z-shaped separator 3 using a mechanical device (such as a mechanical arm). Of course, the electrode plate assemblies of all the laminated groups 11 of the laminated pack 1 and the spacers 2 between the adjacent laminated groups 11 can also be inserted into the Z-shaped separator 3 at several times.

Figure 9:
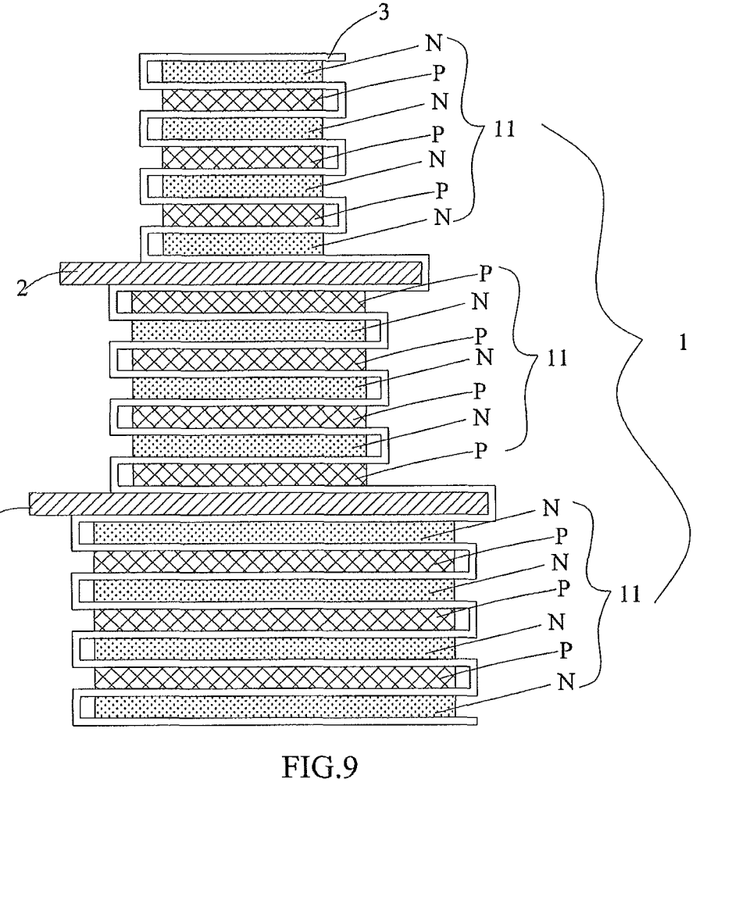
FIG. 9 illustrates another embodiment of the preparation method of the laminated cell according to the present disclosure, in which different laminated groups adopt the electrode plate assemblies having different shapes and/or sizes.

In an embodiment, in the step of providing the laminated pack, the laminating order of the electrode plate assemblies of different laminated groups 11 are the same (referring to FIG. 1, FIG. 2) or different (referring to FIG. 9).

Figure 8:
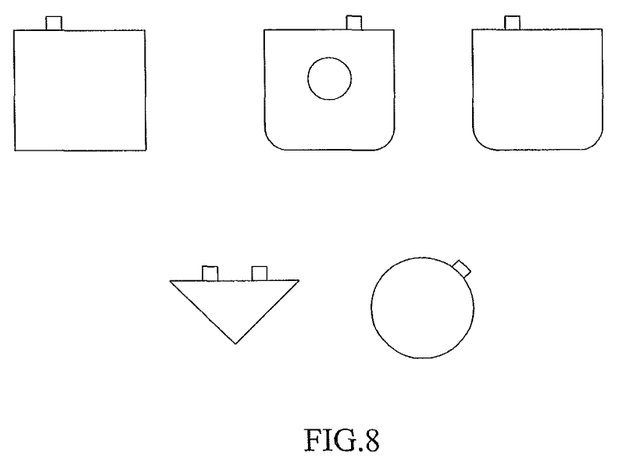
FIG. 8 illustrates the electrode plate assemblies having different shapes and/or sizes.
Figure 10:
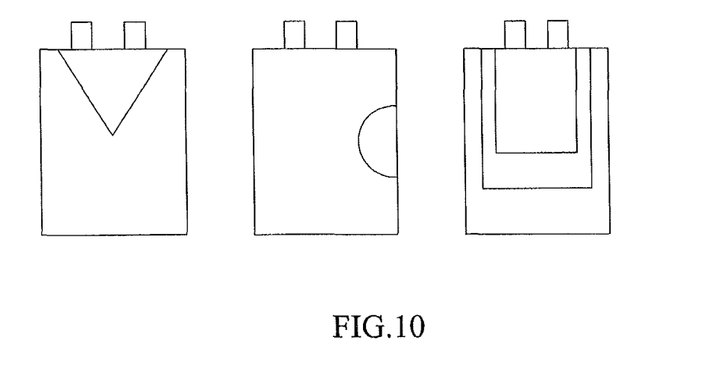
FIG. 10 illustrates non-rectangular cells which can be prepared in FIG. 9.

In an embodiment, in the step of providing the laminated pack, the electrode plate assemblies of the same laminated group 11 are the same in shape and size, the electrode plate assemblies of different laminated groups 11 are the same (referring to FIG. 1, FIG. 2) in shape and size or different (referring to FIG. 9) in shape and/or size. Preferably, the electrode plate assemblies of all the laminated groups 11 are all the same in shape and size, and this makes it easy to select a suitable separator 3 in shape and size. FIG. 8 illustrates the electrode plate assemblies having different shapes and/or sizes, in which a triangular electrode plate assembly is a mono-cell and provided with two electrode tabs, and other electrode plate assemblies are positive electrode plates or negative electrode plates and each are only provided with one electrode tab. When the electrode plate assemblies of different laminated groups 11 are different in shape and/or size, referring to FIG. 9, after the separator 3 is broken at the spacer 2 and the laminated cell SC is formed, the separator 3 in the obtained laminated cell SC is cut, so as to allow the separator 3 of the each laminated cell SC and the electrode plate assembly of the laminated cell SC to match in shape and size, then these laminated cells SC are combined together to form a non-rectangular cell (referring to FIG. 10).

Figure 1:
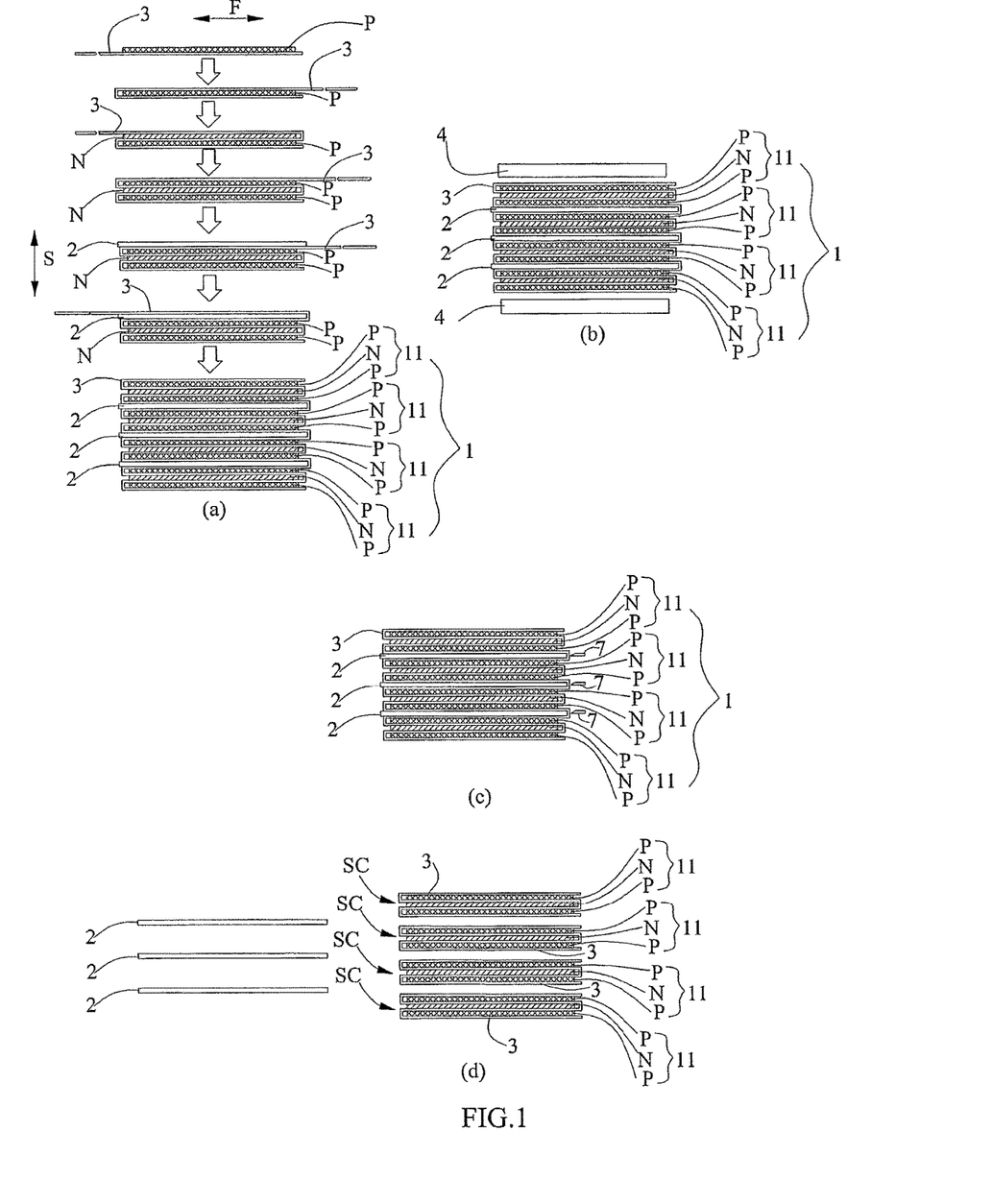
FIG. 1 is a schematic view illustrating a preparation method of a laminated cell according to an embodiment of the present disclosure, in which (a)-(d) each illustrate a step.

In an embodiment, referring to FIG. 1, in the step of providing the laminated pack, the electrode plate assemblies of the each laminated group 11 positioned on the outermost sides are both positive electrode plates P.

Figure 2:
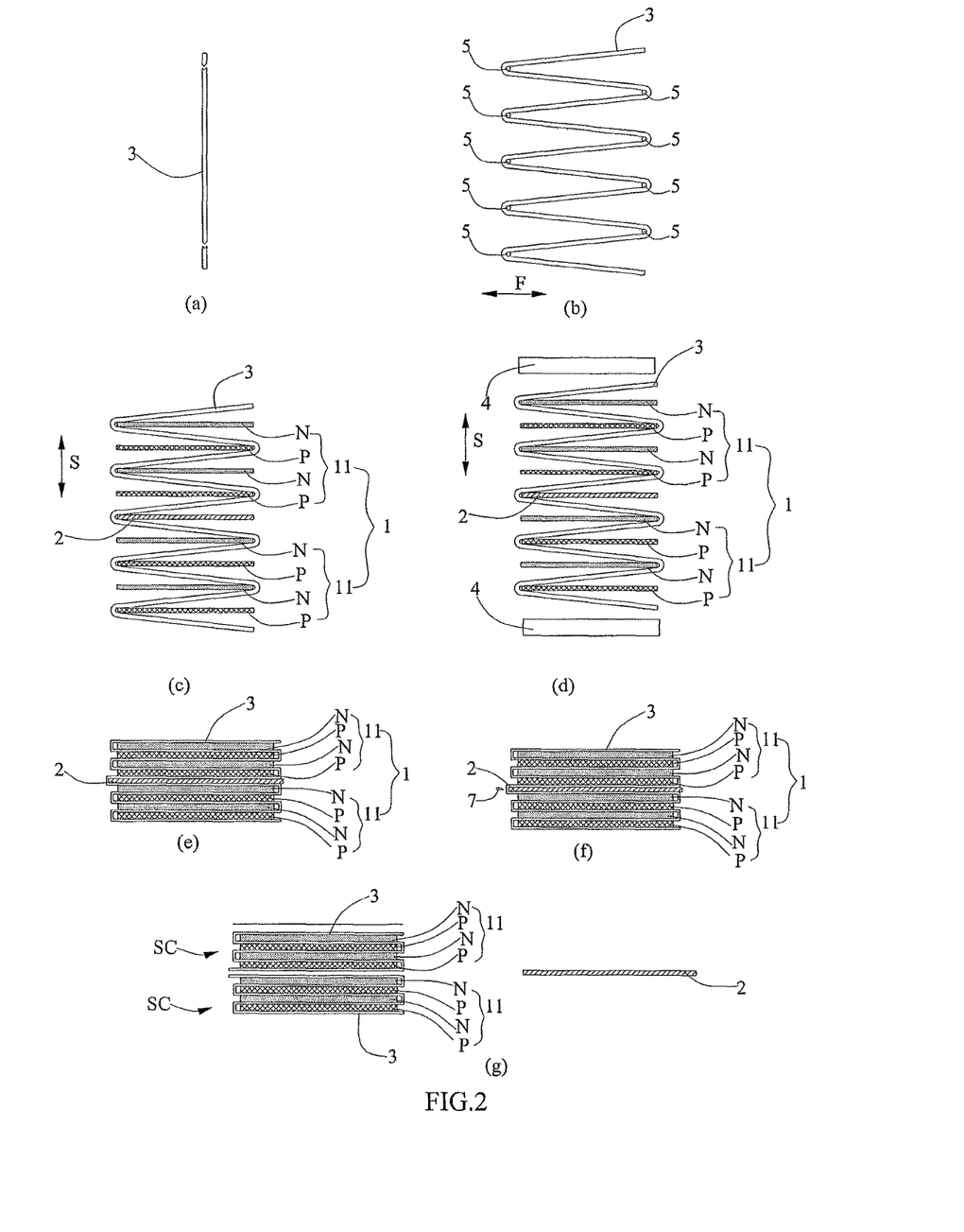
FIG. 2 is a schematic view illustrating the preparation method of the laminated cell according to another embodiment of the present disclosure, in which (a)-(g) each illustrate a step.

In an embodiment, referring to FIG. 2, in the step of providing the laminated pack, the electrode plate assemblies of the each laminated group 11 positioned on the outermost sides are a positive electrode plate P and a negative electrode plate N respectively.

In the preparation method of the laminated cell according to the present disclosure, a material of the separator 3 may be selected from at least one of vinyl polymer and vinyl copolymer, polyimide, polyamide, polyester, cellulose derivative, and polysulfonate. When the material of the separator 3 is selected from vinyl polymer and vinyl copolymer, the separator 3 may be a PP separator, a PE separator or a PP/PE/PP three-layer composite separator.

In an embodiment, at least a surface of the separator 3 may be provided with an adhesive coating. In an embodiment, the adhesive coating contains polyvinylidene fluoride (PVDF). In an embodiment, the adhesive coating further contains inorganic particles. The inorganic particle may be $Al_2O_3$ or $SiO_2$.

In an embodiment, a stiffness of the material of the spacer 2 may be 50 GPa~300 GPa, of course it is not limited to that, as long as the each spacer 2 has a strength that the spacer 2 is not plastically deformed when the spacer 2 is subjected to the pressure of a pressing mechanism 4 (later described). In an embodiment, the material of the spacer 2 may be a metal or an organic resin. The metal may be selected from aluminum (Al) or stainless steel. The organic resin may be acrylic resin.

In an embodiment, referring to FIG. 1, FIG. 2, FIG. 5, FIG. 6 and FIG. 9, a length L2 of the each spacer 2 may be not less than a width W3 of the separator 3, a width W2 of the each spacer 2 may be not less than the maximum width of the electrode plate assemblies of the two adjacent laminated groups 11 located above and below. In this way, the each spacer 2 can effectively separate the upper part and the lower part of the adjacent separator 3 and prevent the upper part and the lower part from adhering together in the case that at least the surface of the separator 3 is provided with the adhesive coating.

Of course it is not limited to that, the length L2 of the each spacer 2 may be smaller than the width W3 of the separator 3, the width W2 of the each spacer 2 may be smaller than the maximum width of the electrode plate assemblies of the two adjacent laminated groups 11 located above and below, as long as the each spacer 2 separates the upper part and the lower part of the adjacent separator 3.

In an embodiment, referring to FIG. 1, FIG. 2, FIG. 5, FIG. 6 and FIG. 9, in the step of forming the laminated cell, when the width W2 of the each spacer 2 is greater than the maximum width of the electrode plate assemblies of the two adjacent laminated groups 11 located above and below, the separator 3 may be broken by cutting (for example, a cutter 7 is adopted in FIG. 1 and FIG. 2) and/or hot-breaking at the each spacer 2. Furthermore, referring to FIG. 5, in the step of forming the laminated cell, when the width W2 of the each spacer 2 is greater than the maximum width of the electrode plate assemblies of the two adjacent laminated groups 11 located above and below and the each spacer 2 protrudes for the same size from the electrode plate assembly having the maximum width in the two adjacent laminated groups 11 located above and below at a corresponding side of the laminated pack 1 along the folding direction F, the separator 3 is broken by hot-breaking at the ends of all the spacers 2 positioned in the separator 3 at the corresponding side along the folding direction F at a time. Furthermore, referring to FIG. 5, in the step of forming the laminated cell, the separator 3 is broken by hot-breaking at the ends of all the spacers 2 positioned in the separator 3 at the corresponding side along the folding direction F using a hot plate 6 at a time. In an embodiment, in the step of forming the laminated cell, a temperature of the hot plate 6 is 70° C.~200° C. In an embodiment, in the step of forming the laminated cell, when the width W2 of the each spacer 2 is equal to the maximum width of the electrode plate assemblies of the two adjacent laminated groups 11 located above and below, the separator 3 is broken by cutting at the end of the each spacer 2 positioned in the separator 3. In an embodiment, in the step of forming the laminated cell, when the width W2 of the each spacer 2 is smaller than the maximum width of the electrode plate assembly of the two adjacent laminated groups 11 located above and below, the separator 3 is broken by cutting at the end of the each spacer 2 positioned in the separator 3. In an embodiment, in the step of forming the laminated cell, cutting may be laser cutting or mechanical cutting.

In the preparation method of the laminated cell according to the present disclosure, referring to FIG. 1 and FIG. 2, the preparation method of the laminated cell further comprises a step between the step of providing the laminated pack and the step of forming the laminated cell: pressing the laminated pack: pressing the laminated pack 1 along the laminating direction S using a pressing mechanism 4, so as to allow the electrode plate assemblies of the each laminated group 11 of the laminated pack 1 and the corresponding separator 3 to be bonded together, and the each spacer 2 and the adjacent separator 3 are not bonded together. The step of pressing the laminated pack is adopted, on the one hand, the structure of the each laminated group 11 can be fixed and shaped, so as to prevent moving and malposition of the electrode plate assemblies; on the other hand, when the length L2 of the each spacer 2 is not less than the width W3 of the separator 3 and the width W2 of the spacer 2 is not less than the maximum width of the electrode plate assemblies of the two adjacent laminated groups 11 located above and below, the each spacer 2 and the adjacent separator 3 are not bonded together after pressing the laminated pack 1, and the each spacer 2 separates the upper part and the lower part of the adjacent separator 3, the upper part and the lower part of the separator 3 are not bonded together either, so that it is easier to separate the each spacer 2 and the each laminated cell SC from each other.

In an embodiment, in the step of pressing the laminated pack, the pressing mechanism 4 is a hot press mechanism, and hot pressing is performed on the laminated pack 1 using the hot press mechanism. In an embodiment, a hot pressing temperature adopted by the hot press mechanism is 50° C.~200° C., a hot pressing pressure adopted by the hot press mechanism is 0.1 MPa~1.5 MPa, a hot pressing time by the hot press mechanism is 1 s~120 s. Furthermore, when at least a surface of the separator 3 is provided with the adhesive coating, during pressing the laminated pack, when the pressing mechanism 4 presses the laminated pack 1 along the laminating direction S, the electrode plate assemblies of the each laminated group 11 of the laminated pack 1 and the corresponding separator 3 are bonded together by adhering via an adhesive in the adhesive coating, but the each spacer 2 and the adjacent separator 3 and the adhesive in the adhesive coating are not bonded to each other, so that the each spacer 2 and the adjacent separator 3 are not bonded together. The structure of the each laminated group 11 after pressing is more stable based on the adhesive coating, so that it is easier to separate the each spacer 2 and the adjacent separator 3 to obtain the each laminated cell SC, and it is easier to perform pick-up operation on the obtained laminated cell SC. Preferably, in order to better ensure that the each spacer 2 and the adjacent separator 3 and the adhesive in the adhesive coating are not adhered to each other. In an embodiment, an upper surface and a lower surface of the each spacer 2 may be each provided with an anti-adhesive coating.

Here, it should be noted that, the "bonded" refers to that the electrode plate assembly of the each laminated group 11 of the laminated pack 1 and the corresponding separator 3 are combined to each other without detaching, so as to allow the structure of the each laminated group 11 to be regular and stable. And "not bonded" refers to that the each spacer 2 and the adjacent separator 3 are not combined together, so that it is easier to separate the each spacer 2 and the adjacent separator 3 from each other, so as to separate the each laminated group 11.

In the preparation method of the laminated cell according to the present disclosure, the preparation method of the laminated cell further comprises a step after the step of forming the laminated cell: performing hot pressing on the obtained laminated cell SC using a hot press mechanism. Furthermore, a hot pressing temperature adopted by the hot press mechanism is 50° C.~200° C., a hot pressing pressure adopted by the hot press mechanism is 0.1 MPa~1.5 MPa, a hot pressing time adopted by the hot press mechanism is 1 s~120 s, so as to stabilize the structure of the laminated cell SC.

The present disclosure provided herein describes features in terms of specific and exemplary embodiments thereof. Numerous other embodiments, modifications and variations within the scope and spirit of the appended claims will occur to persons of ordinary skill in the art from a review of this disclosure.

What is claimed is:

1. A preparation method of a laminated cell, comprising steps of:
    providing a laminated pack: the laminated pack comprising n laminated groups, each laminated group comprising m electrode plate assemblies and the numbers of the electrode plate assemblies of all the n laminated groups being the same or different, and n≥2, m≥2, a spacer being provided between each two adjacent laminated groups, the electrode plate assemblies of all the n laminated groups of the laminated pack and the spacers between the two adjacent laminated groups being orderly positioned in a Z-folding type separator in a laminating direction, an upper part and a lower part of the separator adjacent to each spacer being separated by the spacer, each electrode plate assembly being one positive electrode plate provided with a positive electrode tab or one negative electrode plate provided with a negative electrode tab; and forming a laminated cell: the separator being broken at an end of each spacer positioned in the separator to allow the spacer and each two adjacent laminated groups to separate from each other, so as to obtain a corresponding laminated cell formed by the electrode plate assemblies of the laminated group and a corresponding part of the separator; the each laminated cell comprising at least one positive electrode plate provided with a positive electrode tab and at least one negative electrode plate provided with a negative electrode tab the positive electrode tab and the negative electrode tab of each laminated cell being provided on the same side or different sides in a direction perpendicular to the laminating direction of the laminated pack and a folding direction of the Z-folding type separator.

2. The preparation method of the laminated cell according to claim 1, wherein in the step of providing the laminated pack, a manner for providing the laminated pack is as follows:

providing a first laminated group: putting a first electrode plate assembly of the first laminated group on an end portion of the separator, folding the separator and attaching the separator to the first electrode plate assembly of the first laminated group, then putting a second electrode plate assembly of the first laminated group on the folded separator, folding the separator again and attaching the separator to the second electrode plate assembly of the first laminated group, such repeated, until the m-th electrode plate assembly is put on the separator and the separator is folded;

putting the spacer on the separator and folding the separator;

providing a second laminated group: putting a first electrode plate assembly of the second laminated group on the separator folded on the spacer, folding the separator and attaching the separator to the first electrode plate assembly of the second laminated group, then putting a second electrode plate assembly of the second laminated group on the folded separator, folding the separator again and attaching the separator to the second electrode plate assembly of the second laminated group, until the m-th electrode plate assembly of the second laminated group is put on the separator and the separator is folded;

putting another spacer on the separator and folding the separator; and such repeated, until the n-th laminated group is provided.

3. The preparation method of the laminated cell according to claim 1, wherein in the step of providing the laminated pack, a manner for providing the laminated pack is as follows:

supporting the separator to form a Z-folding type separator using a plurality of rollers;

inserting the spacers and the electrode plate assemblies of the each laminated group into the Z-folding type separator, so as to allow the electrode plate assemblies of all the laminated groups of the laminated pack and the spacers between the adjacent laminated groups orderly positioned in the Z-folding type separator; and pulling the plurality of rollers out.

4. The preparation method of the laminated cell according to claim 1, wherein at least a surface of the separator is provided with an adhesive coating.

5. The preparation method of the laminated cell according to claim 1, wherein a stiffness of a material of the spacer is 50 GPa~300 GPa.

6. The preparation method of the laminated cell according to claim 1, wherein a length of the each spacer is not less than a width of the separator, a width of the each spacer is not less than the maximum width of the electrode plate assemblies of the two adjacent laminated groups located above and below.

7. The preparation method of the laminated cell according to claim 4, wherein a length of the each spacer is not less than a width of the separator, a width of the each spacer is not less than the maximum width of the electrode plate assemblies of the two adjacent laminated groups located above and below.

8. The preparation method of the laminated cell according to claim 6, wherein in the step of forming the laminated cell, when the width of the each spacer is greater than the maximum width of the electrode plate assemblies of the two adjacent laminated groups located above and below, the separator is broken by cutting and/or hot-breaking at the end of the each spacer positioned in the separator;

when the width of the each spacer is equal to the maximum width of the electrode plate assemblies of the two adjacent laminated groups located above and below, the separator is broken by cutting at the end of the each spacer positioned in the separator.

9. The preparation method of the laminated cell according to claim 7, wherein in the step of forming the laminated cell, when the width of the each spacer is greater than the maximum width of the electrode plate assemblies of the two adjacent laminated groups located above and below, the separator is broken by cutting and/or hot-breaking at the end of the each spacer positioned in the separator;

when the width of the each spacer is equal to the maximum width of the electrode plate assemblies of the two adjacent laminated groups located above and below, the separator is broken by cutting at the end of the each spacer positioned in the separator.

10. The preparation method of the laminated cell according to claim 8, wherein in the step of forming the laminated cell, when the width of the each spacer is greater than the maximum width of the electrode plate assemblies of the two adjacent laminated groups located above and below and the each spacer protrudes for the same size from the electrode plate assembly having the maximum width in the two adjacent laminated groups located above and below at a corresponding side of the laminated pack along the folding direction, the separator is broken by hot-breaking at the ends of all the spacers positioned in the separator at the corresponding side along the folding direction at a time.

11. The preparation method of the laminated cell according to claim 9, wherein in the step of forming the laminated cell, when the width of the each spacer is greater than the maximum width of the electrode plate assemblies of the two adjacent laminated groups located above and below and the each spacer protrudes for the same size from the electrode plate assembly having the maximum width in the two adjacent laminated groups located above and below at a corresponding side of the laminated pack along the folding direction, the separator is broken by hot-breaking at the ends of all the spacers positioned in the separator at the corresponding side along the folding direction at a time.

12. The preparation method of the laminated cell according to claim 1, further comprising a step between the step of providing the laminated pack and the step of forming the laminated cell:

pressing the laminated pack: pressing the laminated pack along the laminating direction using a pressing mechanism, so as to allow the electrode plate assemblies of the each laminated group of the laminated pack and the corresponding separator to be bonded together, and the each spacer and the adjacent separator are not bonded together.

13. The preparation method of the laminated cell according to claim 4, further comprising a step between the step of providing the laminated pack and the step of forming the laminated cell:

pressing the laminated pack: pressing the laminated pack along the laminating direction using a pressing mechanism, so as to allow the electrode plate assemblies of the each laminated group of the laminated pack and the corresponding separator to be bonded together, and the each spacer and the adjacent separator are not bonded together.

14. The preparation method of the laminated cell according to claim 12, wherein in the step of pressing the laminated pack, the pressing mechanism is a hot press mechanism.

15. The preparation method of the laminated cell according to claim 13, wherein in the step of pressing the laminated pack, the pressing mechanism is a hot press mechanism.

16. The preparation method of the laminated cell according to claim 1, further comprising a step after the step of forming the laminated cell:

performing hot pressing on the obtained laminated cell using a hot press mechanism.

* * * * *